July 26, 1932. W. M. BORGSTROM ET AL 1,869,298
MUD SHOE FOR MOTOR VEHICLE WHEELS
Filed Oct. 27, 1931
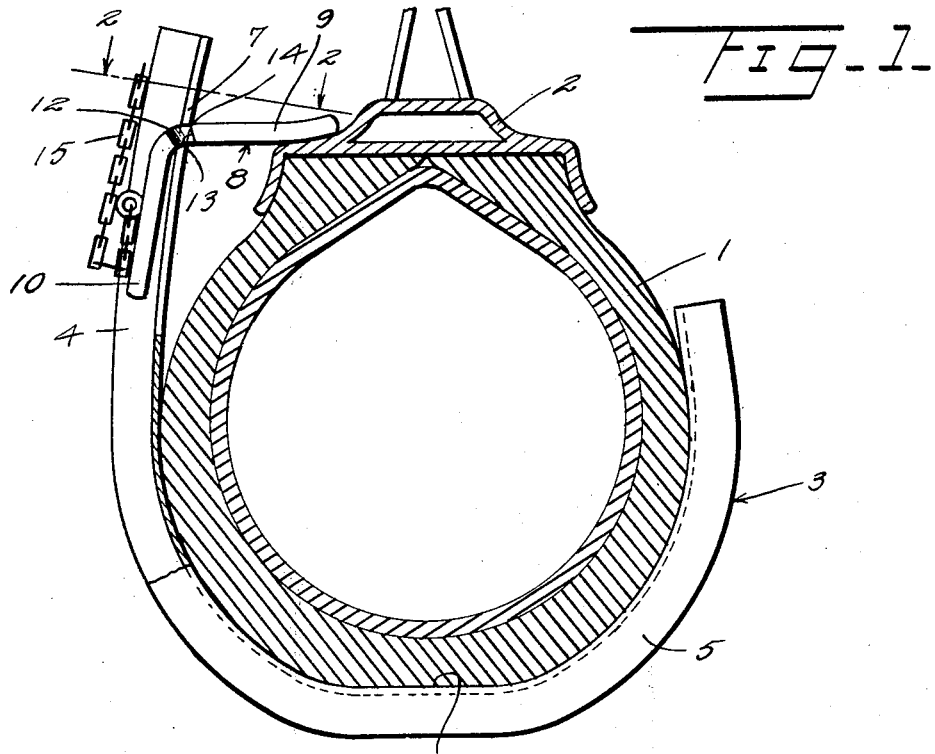
Inventor
W. M. Borgstrom
O. E. Haglund
By Watson E. Coleman
Attorney Patented July 26, 1932

1,869,298

UNITED STATES PATENT OFFICE

WILHELM M. BORGSTROM AND OLOF E. HAGLUND, OF MINNEAPOLIS, MINNESOTA

MUD SHOE FOR MOTOR VEHICLE WHEELS

Application filed October 27, 1931. Serial No. 571,384.

This invention relates to improvements in devices for motor vehicle tires and pertains particularly to a device for improving traction of the tire when the same is in a mud hole or positioned on a slippery surface.

The primary object of the present invention is to provide a mud shoe which may be easily and quickly applied to a wheel tire and which will securely grip the tire so as not to slip when strain is placed thereon.

Another object of the invention is to provide a mud shoe for motor vehicle tires, having a novel securing or locking means whereby the tendency is for the device to constantly increase its grip or hold on the tire, while it is in use.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 shows the device embodying the present invention in applied position and partly in section;

Figure 2 is a sectional view taken on the line 2—2 of Figure 1;

Figure 3 is a view in elevation of the outer side of the upper portion of the mud shoe.

Referring now more particularly to the drawing wherein like numerals of reference indicate corresponding parts throughout the several views, the numeral 1 indicates generally a motor vehicle tire, the same being shown in cross section and applied to a wire wheel rim 2 of the drop center type.

The shoe embodying the present invention is indicated as a whole by the numeral 3 and is formed of steel of channeled or T-shaped cross section.

The shoe illustrated is formed of a channel shaped member and as shown this is bent substantially to the form of the letter J, there being the outside substantially straight shank portion 4 which merges into the rounded or hook portion 5, the bottom of which is, however, slightly flattened as indicated at 6 where the tread of the tire 1 engages the same.

As shown when the shoe is in place on a tire the shank portion extends upwardly across the side of the rim 2 and this shank portion has a longitudinally extending slot 7 formed from the upper end downwardly in the web thereof for the reception of a locking key which is indicated as a whole by the numeral 8.

The key 8 comprises an elongated piece of flat metal bent intermediate its ends to provide the portions 9 and 10 which are in obtusely angled relation. The portion 9 is materially broader than the portion 10 and may be referred to as the keeper portion of the locking element, while the portion 10 will be referred to as the tongue.

As shown the tongue and keeper are connected by a relatively narrow strip of metal 11 so that the opposing ends of these portions 9 and 10 have the recesses 12 therebetween which receive the side portions of the slot 7. The connecting portion 11 is only of slightly less width than the slot 7 so that the opposed edges of the portions 9 and 10 form shoulders which bear against the faces of the web in which the slot 7 is formed.

The inner edges or shoulders of the keeper plate 9 are beveled or undercut as indicated at 13 thus forming the sharp edges 14 which bite into the face of the slotted web portion of the shoe when upward pressure is applied to the outer or free end of the keeper, thus preventing the keeper from sliding upwardly and out of the slot 7.

The tongue portion 10 of the latching element is connected in any suitable manner with the shoe, as for example by a chain 15 one end of which is joined to a flange of the shank portion of the shoe while the other is welded or otherwise suitably secured to the outer face of the tongue.

From the foregoing taken in conjunction with Figure 1 of the drawing it will be seen that in use the hook portion of the shoe receives the tread of the tire while the shank extends upwardly across the outer face thereof and the locking member 8 is applied by slipping the portion 11 down in the slot 7 with the keeper extending inwardly so that its free end will bear against the top or inner side of the wheel rim 2. It will be readily seen that as pressure is applied to the tire and the tire is compressed slightly, the locking member will slip down in the slot 7 and any reverse pressure will be applied to the free outer end of the keeper 9, thus causing it to rock in the slot 7 and force the sharpened shoulder edges 14 into the shank of the shoe to prevent the removal of the locking member from position.

It will be seen that due to the obtusely angled relation of the keeper and tongue the free end of the tongue will stand clear of the outer face of the shoe shank so that when the shoe is to be removed a tool such as a screw-driver may be readily inserted beneath the tongue to pry the same outwardly and thus release the connection between the sharpened shoulders of the keeper and the shank of the shoe.

Having thus described the invention, what is claimed is:—

1. A vehicle tire mud shoe comprising a body having a portion formed to receive the tread of the tire and a portion arranged to extend across the side of the tire, and a locking element carried by the last mentioned portion and designed to engage the adjacent wheel rim, said locking member being so designed for connection with the shoe as to constantly tend to more tightly secure the shoe to the tire.

2. A mud shoe for motor vehicle tires comprising a body having a tire receiving portion and a straight portion arranged to extend across the side of the tire, and a locking member having sliding connection with said straight portion and designed to extend inwardly for engagement with the wheel rim, said locking member having shoulders engaging the straight portion in such a manner as to resist movement of the locking member in one direction by force applied to the rim engaging portion thereof.

3. A vehicle tire mud shoe comprising a body having a tire receiving portion and a straight portion designed to extend across the side of the tire, said straight portion having a longitudinal slot therein, and a locking member comprising a keeper plate and means for slidably coupling one end of the plate in said slot, the other end of the plate being engaged over the adjacent wheel rim, said plate further having shoulders designed to engage the said straight portion of the shoe to resist movement of the keeper plate out of said slot.

4. A motor vehicle tire mud shoe comprising a relatively narrow body having a portion formed to receive a tire tread and a straight shank portion designed to extend across the side of the tire, said shank portion having a longitudinally extending slot therein opening through the free end thereof, and a locking element for securing the shoe to the tire, comprising a pair of flat members arranged in angular relation and having a narrow connecting portion therebetween thus forming opposed shoulders, said connecting portion being designed for slidable engagement in said slot, one of said members constituting a keeper, the free end of which is designed to engage the wheel rim, the said shoulders of the keeper being formed to provide cutting edges designed to bite into the shank of the shoe body when the keeper is in engagement with the rim to prevent movement of the securing member out of the slot.

In testimony whereof we hereunto affix our signatures.

WILHELM M. BORGSTROM.
OLOF E. HAGLUND.